United States Patent [19]
Ferng

[11] Patent Number: 5,588,909
[45] Date of Patent: Dec. 31, 1996

[54] SOLAR POWER-OPERATED COOLING SYSTEM FOR MOTOR VEHICLES

[76] Inventor: Shing-Lai Ferng, No. 29, Her Lih Street., Taipeng, Taichung Hsien, Taiwan

[21] Appl. No.: 456,315

[22] Filed: Jun. 1, 1995

[51] Int. Cl.$^6$ ............................................. B60H 3/06
[52] U.S. Cl. ................... 454/141; 454/158; 454/164; 454/900
[58] Field of Search ................... 454/141, 143, 454/158, 164, 900

[56] References Cited

U.S. PATENT DOCUMENTS

| | | | |
|---|---|---|---|
| 3,805,684 | 4/1974 | Atkinson | 454/164 |
| 4,558,634 | 12/1985 | Oshiro et al. | 454/900 X |
| 4,691,623 | 9/1987 | Mizusawa | 454/164 |
| 4,741,256 | 5/1988 | Huang | 454/900 X |
| 4,972,265 | 11/1990 | Dixon | 454/164 |
| 5,205,781 | 4/1993 | Kanno et al. | 454/900 X |
| 5,370,576 | 12/1994 | Krofchalk | 454/143 |

FOREIGN PATENT DOCUMENTS

| 51141 | 4/1979 | Japan | 454/900 |
|---|---|---|---|

Primary Examiner—Harold Joyce
Attorney, Agent, or Firm—Bacon & Thomas

[57] ABSTRACT

A solar power-operated cooling system installed in a motor vehicle for circulation of air, including a solar power device having a plurality of photovoltaic cells mounted for converting the radiant energy of sunlight into electric power and a power output terminal for output of electric power from the photovoltaic cells, an electric connector having an input terminal connected to the power output terminal of the solar power device and at least two output terminals, at least one blowing fan and at least one exhaust fan respectively installed in the interior door panel assemblies of the motor vehicle and electrically connected to the output terminals of the electric connector and driven to draw fresh air into or to draw hot air out of the motor vehicle.

3 Claims, 2 Drawing Sheets

SOLAR POWER-OPERATED COOLING SYSTEM FOR MOTOR VEHICLES

BACKGROUND OF THE INVENTION

The present invention relates to cooling systems for motor vehicles, and relates more particularly to solar power-operated cooling system for cooling the inside of a motor vehicle by means of the synchronous operation of blowing fans and exhaust fans.

When a motor vehicle is parked outdoors during a hot day, the inside of the motor vehicle becomes hot and humid within a short period of time after parking. Therefore, people tend to open the door and turn on the air conditioner to cool down the inside of the motor vehicle before entering the motor vehicle. Furthermore, when the air conditioner of a motor vehicle is operated, the air inside the motor vehicle becomes dirty quickly if the driver or passenger smokes. Therefore, when smoking, the windows of the doors must be lowered for letting inside air out. However, when the windows of the doors are lowered, a high noise will occur when the motor vehicle runs at a high speed. There are motor vehicles installed with blowing fans for drawing outside fresh air into the inside. However, because these blowing fans are commonly connected to the battery power supply circuit, they tend to affect the horsepower of the engine. Besides, these blowing fans do not work when the motor vehicle is not started. There is developed a cooling fan device for motor vehicles. This cooling fan device comprises a wedge-like base, a solar battery at one side of the base, and an exhaust fan at an opposite side of the base. The base has two extension racks at two opposite sides for mounting on the top edge of the window glass. When installed, the window glass cannot be completely closed because a gap must be left for passing of air. Because the window glass cannot be completely closed, the door can be easily destroyed or opened by a lever. In addition, because the solar battery is disposed in parallel to the window glass, it cannot efficiently collect the radiant energy of sunlight for converting into electric power. Furthermore, in order to fix the cooling device to the window glass, a double-sided adhesive tape is commonly used. However, using a double-sided adhesive tape to fasten the cooling device to the window glass will destroy the sense of beauty of the motor vehicle.

SUMMARY OF THE INVENTION

The present invention provides a solar power-operated cooling system which comprises a solar power device having a plurality of photovoltaic cells mounted for converting the radiant energy of sunlight into electric power and a power output terminal for output of electric power from the photovoltaic cells, an electric connector having an input terminal connected to the power output terminal of the solar power device and at least two output terminals, at least one blowing fan and at least one exhaust fan respectively installed in the interior door panel assemblies of the doors of the motor vehicle and electrically connected to the output terminals of the electric connector and driven to draw fresh air into or to draw hot air out of the motor vehicle. This solar power-operated cooling system achieves numerous advantages as outlined hereinafter.

1) It neither consumes fuel gas nor causes an air pollution during the operation because it uses the radiant energy of sunlight to drive the fans;

2) It works more efficient when hot because the intensity of power output of the solar power device is directly proportional to the intensity of the radiant energy of sunlight;

3) It completely expels carbon monoxide out of the inside of the motor vehicle because blowing fans and exhaust fans are synchronously operated;

4) It does not affect the operation of the motor vehicle because it is an independent system with self-provided power supply which does not consume the battery power supply of the motor vehicle; and 5) It does not affect the security of the motor vehicle because the windows of the doors of the motor vehicle can be maintained completely closed when it is installed.

DETAILED DESCRIPTION OF THE PREFERRED EMBODIMENT

Figure 1:
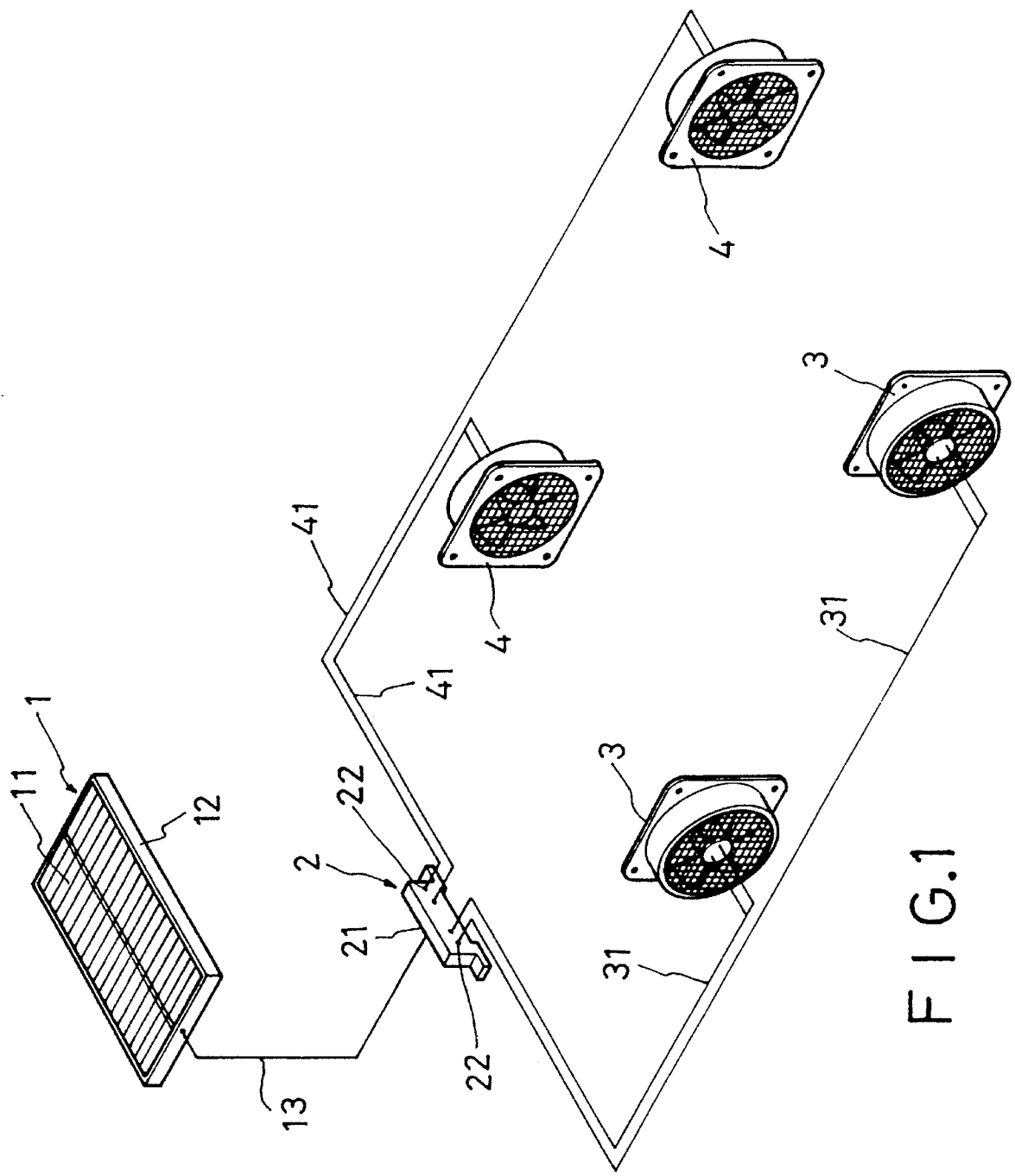
FIG. 1 is the only drawing of the present invention which shows the hardware arrangement of the solar power-operated cooling system.

Referring to FIG. 1, a solar power-operated cooling system in accordance with the present invention is generally comprised of a solar power device 1, an electric connector 2, a plurality of blowing fans 3, and a plurality of exhaust fans 4.

The solar power device 1 comprises a frame 12, a plurality of photovoltaic cells 11 mounted within the frame 12 to convert the radiant energy of sunlight into electric power, and a power output line 13 connected to the electric connector 2 for transmitting electric power from the photovoltaic cells 11 to the blowing fans 3 and the exhaust fans 4 through the connector 2. The electric connector 2 has an input terminal 21 connected to the power output line 13 of the solar power device 1, and a plurality of output terminals 22 respectively connected to the blowing fans 3 and the exhaust fans 4. The blowing fans 3 are of regular commercially available blowing fans commonly comprised of a fan motor and a fan blade unit driven by the fan motor, each having a power input line 31 connected to one output terminal 22 on the electric connector 2. The exhaust fans 3 are of regular commercially available exhaust fans commonly comprised of a fan motor and a fan blade unit driven by the fan motor, each having a power input line 41 connected to one output terminal 22 on the electric connector 2.

Figure 2:
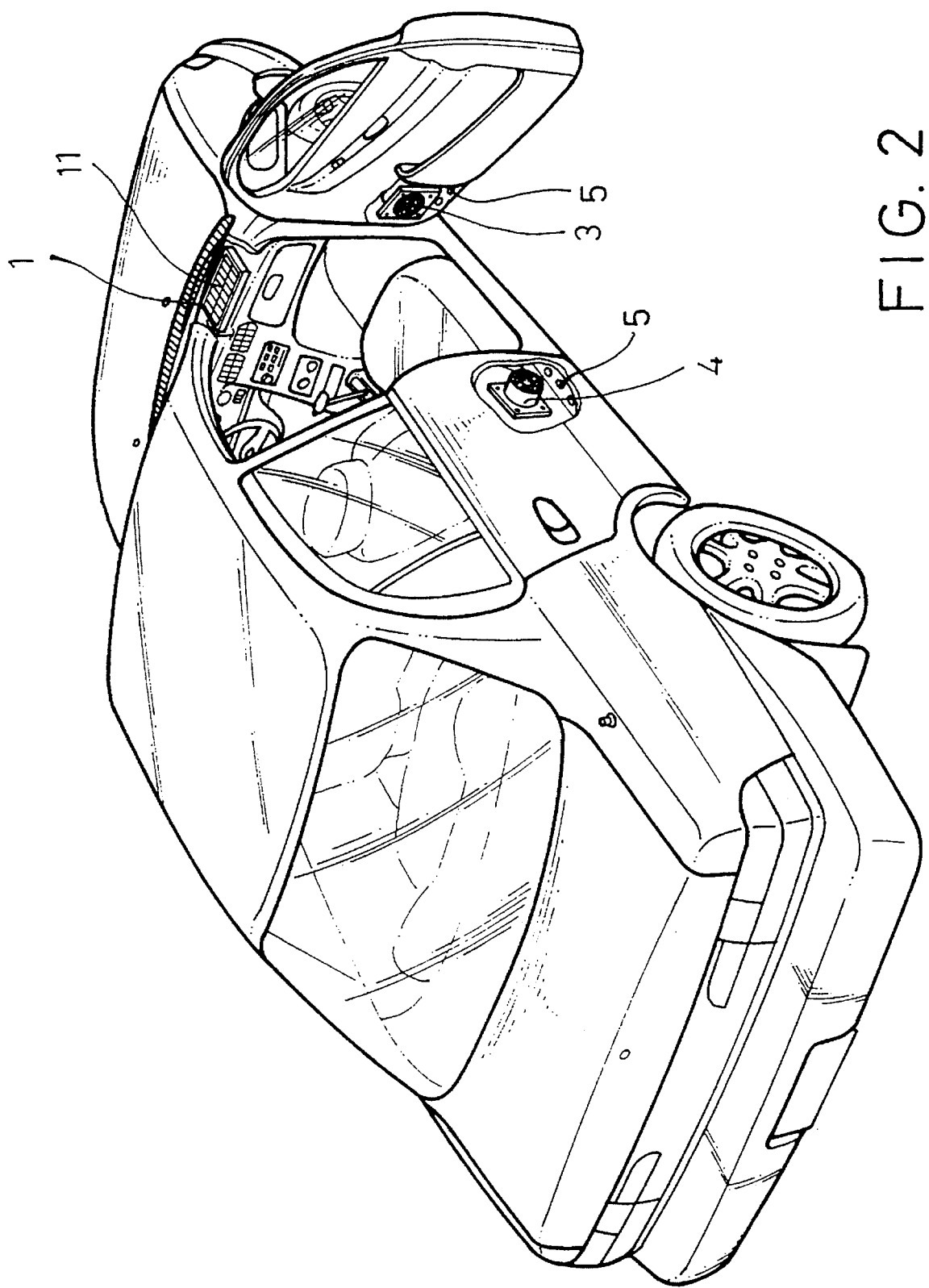
FIG. 2 is a perspective view of a vehicle incorporating the solar power-operated cooling system according to the invention.

Referring to FIGS. 1 and 2, the blowing fans 3 and the exhaust fans 4 are respectively installed in the interior door panel assemblies of the motor vehicle, the solar power device 1 is fastened to the top of the instrument board of the motor vehicle with the photovoltaic cells 11 turned toward the sun. Therefore, electric power is transmitted from the photovoltaic cells 11 to the blowing fans 3 and the exhaust fans 4, causing them to operate. Intake fresh air and exhaust hot air are respectively drawn into or out of the motor vehicle through the drain holes 5 on the doors of the motor vehicle. Because the intensity of power output of the solar power device 1 is directly proportional to the intensity of the radiant energy of sunlight, a considerable power supply is transmitted to the blowing fans 3 and the exhaust fans 4 when the sunlight is hot.

Referring to FIG. 1 again, when two blowing fans 3 and two exhaust fans 4 are used, they can be respectively installed in the interior door panel assemblies of the front and rear doors of the motor vehicle so that heat can be efficiently carried out of the inside of the motor vehicle and fresh air can be drawn into all corners inside the motor vehicle through the drain holes on the respective doors of the motor vehicle. Furthermore, each blowing fan 3 is covered with a respective wire gauze filter to filtrate air passing into the motor vehicle.

It is to be understood that the drawings are designed for purposes of illustration only, and are not intended as a definition of the limits and scope of the invention disclosed.

I claim:

1. A solar power-operated cooling system for circulating air in a motor vehicle, the system comprising:

(a) a solar power device including a frame, a plurality of photovoltaic cells mounted within the frame for convening the radiant energy of sunlight into electric power, and a power output terminal for the output of electric power from the photovoltaic cells;

(b) an electric connector including an input terminal connected to the power output terminal of the solar power device, and first and second output terminals;

(c) a first blowing fan electrically connected to the first output terminal of the electric connector for installation in a first door assembly of a motor vehicle to draw outside fresh air into the interior of the motor vehicle through the first door assembly of the motor vehicle; and (d) a first exhaust fan electrically connected to the second output terminal of the electric connector for installation in a second door assembly of the motor vehicle to draw inside hot air of the motor vehicle through drain holes in the second door assembly of the motor vehicle.

2. The system of claim 1 wherein:

(a) the electric connector further includes third and fourth output terminals;

(b) a second blowing fan electrically connected to the third output terminal of the electric connector for installation in a third door assembly of the motor vehicle;

(c) a second exhaust fan electrically connected to the fourth output terminal of the electric connector for installation in a fourth door assembly of the motor vehicle.

3. The system of claim 2 wherein each blowing fan includes a filter for filtering air passing into the motor vehicle.

* * * * *